United States Patent [19]

Blatchford

[11] 3,992,613

[45] Nov. 16, 1976

[54] TACAN FLYING TARGET CONTROL SYSTEM

[75] Inventor: Dean Blatchford, Woodland Hills, Calif.

[73] Assignee: The United States of America as represented by the Secretary of the Navy, Washington, D.C.

[22] Filed: Oct. 3, 1975

[21] Appl. No.: 619,555

[52] U.S. Cl. .................. 235/150.27; 235/150.26; 244/3.14; 244/3.19
[51] Int. Cl.² .......................................... G06F 15/50
[58] Field of Search ................ 235/150.26, 150.27; 244/3.11, 3.14, 3.15, 3.19; 343/7.4, 10, 112 D, 113 R

[56] References Cited
UNITED STATES PATENTS

| | | | |
|---|---|---|---|
| 3,179,355 | 4/1965 | Pickering et al. | 244/3.14 |
| 3,371,887 | 3/1968 | Welti | 244/3.11 |
| 3,560,971 | 2/1971 | Alsberg et al. | 244/3.14 X |
| 3,680,749 | 8/1972 | Davis | 244/3.14 |
| 3,902,684 | 9/1975 | Queeney | 244/3.14 |

*Primary Examiner*—Jerry Smith
*Attorney, Agent, or Firm*—Richard S. Sciascia; Joseph M. St. Amand; William W. Cochran, II

[57] ABSTRACT

A flying target control system for directing a flying target along a radio beam heading toward a ship under simulated attack according to a preselected altitude and speed profile. The control system utilizes a TACAN transceiver which receives TACAN signals emitted from the ship under simulated attack. The TACAN transceiver produces an azimuth signal to steer the target via an automatic pilot toward the ship under simulated attack and a range signal which is used to address a profile storage device. The profile storage device produces altitude profile control signals and speed profile control signals according to the range of the target from the ship which are fed into the automatic pilot to guide the target along its preselected altitude and speed profile.

13 Claims, 2 Drawing Figures

TACAN FLYING TARGET CONTROL SYSTEM

BACKGROUND OF THE INVENTION

The present invention pertains generally to signal control devices and more particularly to program flight guidance systems. Of utmost importance to the Navy is the protection of their ships to the open sea. Many defense systems have been developed by the Navy to guard against surprise attacks. To test and evaluate the effectiveness of these systems, a system is needed whereby a surprise attack can be simulated. Typically, enemy targets are found to make evasive maneuvers as to their speed and altitude while flying towards a ship under attack. Flying targets simulating a surprise enemy attack must therefore also be capable of taking similar evasive maneuvers to properly simulate the enemy attack. Various methods have been conceived for controlling the flight of a target to authenticate the environment of the surprise enemy attack. One system has utilized the Loran navigational system to preprogram the target with a series of navigational points constituting an evasive flight profile to intercept the ship under simulated attack. Due to the nature of the Loran system, the targets cannot be programmed for a routine flight pattern but must be programmed for the specific navigational points involved in each simulated attack exercise. The costs involved in programming a target for specific navigational points are excessive. Furthermore, the Loran system is not in operation in many points on the open ocean so that these exercises must be limited to specific areas.

Another system investigated utilizes the IFF radar systems presently in use. To use the IFF radar system it is necessary, however, to modify the system to provide the necessary information to the target as to location and range of the ship. The process of modifying the presently existing IFF systems would be quite expensive. Furthermore, if the target were picked up by an enemy, they could extract extensive information pertaining to the operation of the highly classified IFF detection system. Moreover, the IFF system is one of the main systems desired to be tested in a simulated attack environment. Using this system for controlling the attack target would defeat the purpose of testing the IFF system as to its effectiveness. Other systems have also been proposed using various beacon devices. However, these systems were found to be generally unsuitable because of added costs.

SUMMARY OF THE INVENTION

The present invention overcomes the disadvantages and limitations of the prior art devices by providing a TACAN flying target control system. The present invention utilizes the TACAN (tactical air navigation) system presently in use. In operation, a TACAN transceiver located on the flying target receives range and azimuth information from the TACAN signal transmitted from a ship indicating the location of the ship with regard to the target. This information is used by the device of the present invention to steer the target along a radial path toward the ship with an autopilot unit. The range information is used to address a storage unit which has been preprogrammed to adjust the altitude and speed of the target to a preselected flight profile as the target approaches the ship simulating typical evasive maneuvers.

It is therefore an object of the present invention to provide a flying target control system.

It is also an object of the present invention to provide a flying target control system which can be preprogrammed to control the flight of the target to conform with a preselected flight profile.

Another object of the present invention is to provide a flying target control system which is easy and inexpensive to implement.

Another object of the present invention is to provide a flying target control system which utilizes existing systems of both targets and ships.

Other objects and further scope of applicability of the present invention will become apparent from the detailed description given hereinafter. The detailed description indicating the preferred embodiment of the invention is given only by way of illustration since various changes and modifications within the spirit and scope of the invention will become apparent to those skilled in the art from this detailed description. The foregoing abstract of the disclosure is for the purpose of providing a non-legal brief statement to serve as a searching and scanning tool for scientists, engineers and researchers and is not intended to limit the scope of the invention as disclosed herein, nor is it intended that it should be used in interpreting or in any way limiting the scope or fair meaning of the appended claims.

DETAILED DESCRIPTION OF THE PREFERRED EMBODIMENT

Figure 1:
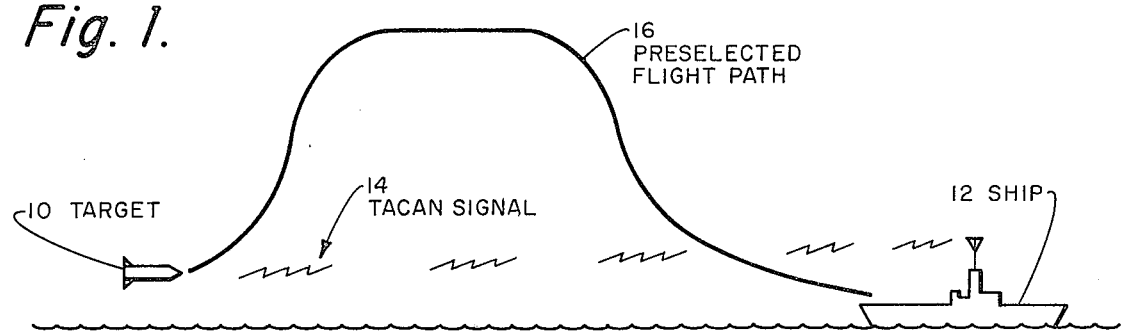
FIG. 1 is a side view of a typical simulated surprise attack encounter.

FIG. 1 is a diagram of the simulated enemy attack by target 10 upon ship 12. Ship 12 radiates a TACAN signal 14 which is received by the target 10 to guide it along a preselected flight path 16 to intercept the ship. The target 10 flies a radial path directly toward the ship 12 as soon as it is within range of the TACAN signal 14. Range information from the TACAN signal 14 is used to control the elevation and speed of the target 10 such that it follows the preselected flight path 16.

Figure 2:
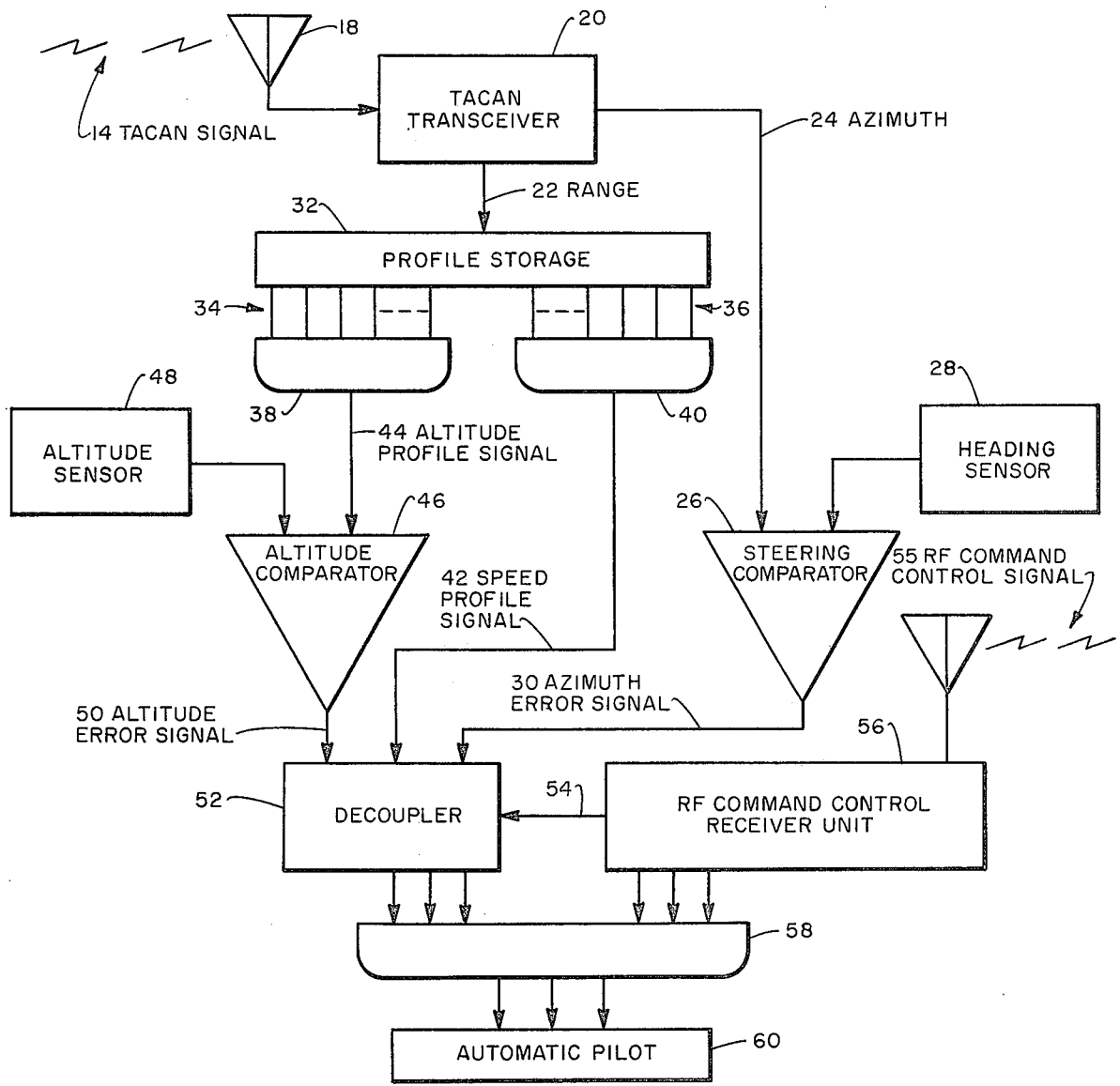
FIG. 2 is a block diagram of the preferred embodiment of the invention.

FIG. 2 is a block diagram of the preferred embodiment of the invention. The TACAN signal 14 is picked up by the antenna system 18 of the flying target. TACAN transceiver 20 receives the TACAN information signal and produces a range output signal 22 indicative of the range of the target from the ship and an azimuth output signal 24 indicative of the azimuthal bearing to the ship 12. The azimuth signal 24 is applied to a steering comparator 26 which compares the heading of the target which is indicated by heading sensor 28 with a required heading to reach the ship as produced by azimuth signal 24. The output of the steering comparator 26 is an azimuth error signal 30 indicating the magnitude of error with respect to the present heading of the target so that the target can be redirected to follow a course directly toward ship 12. Simultaneously, range signal 2 produced by TACAN transceiver 20 is an indication of the range between the target 10 and the ship 12. The profile storage circuit 32 is preprogrammed to read out of storage preselected altitudes and speeds for the target 10. At each particular range value of the target from the ship 12, the range signal 22 addresses the preselected flight profile parameters from the profile storage circuit 32. Altitude profile parameters are indicated at the output of profile storage circuit 32 at outputs 34. Similarly, outputs 36 provide a means for reading out the speed profile parameters. Logic circuits 38 and 40 provide gating of the selected parameter to signal outputs 42 and 44.

The altitude profile signal applied along output 44 of logic circuit 38 is compared in altitude comparator 46 against the present altitude of the target 10 indicated by the output from altitude sensor 48. The altitude comparator 46 produces an altitude error signal 50 indicative of the amount of error in the altitude of the target as compared to the preselected flight profile. The altitude error signal 50, speed profile signal 42 and azimuth error signal 30 are all applied to a decoupler 52 which prevents application of these signals to logic circuit 58 and automatic pilot 60 whenever a control pulse is produced from the RF command control receiving unit 56 over line 54. The RF command control receiver unit acts as an override control for manually controlling from a ground station, the flight path of a target. An RF command control signal 55 is generated from a ground station and contains altitude, speed and bearing information which is applied to logic circuit 58 and subsequently to automatic pilot 60 to control the flight path of the pilot 60 to control the flight path of the target 10. The control pulse 54 is generated whenever the RF command control receiver unit is activated so that the preselected flight path stored in the memory will not be applied to the automatic pilot 60. Logic circuitry 58 acts to gate information at its input to its output for application to the automatic pilot 60.

The present invention therefore provides a flight control system which can be preprogrammed to fly a preselected flight profile or be controlled directly by RF command control pulses from the ground. The system operates independently of specific navigational locations and utilizes many of the existing ship and target systems allowing inexpensive implementation in presently used systems. Furthermore, the system can be used on the open ocean in any location and all the defense mechanisms of the ship can be tested in a simulated attack environment.

Obviously many modifications and variations of the present invention are possible in light of the above teachings. It is therefore to be understood that within the scope of the appended claims the invention may be practiced otherwise than as specifically described.

What is claimed is:

1. A target guidance system for directing a flying target along a preselected altitude and speed profile in a radial beam heading toward an object under simulated attack comprising:
   a. means within said target for producing a first signal representative of range to said object and a second signal representative of azimuthal bearing to said object from a TACAN signal radiated from said object,
   b. storage means addressed by said first signal for producing an altitude profile signal and a speed profile signal stored in said storage means at address locations corresponding to said range to said object,
   c. means for comparing said altitude profile signal with a signal representative of actual altitude of said flying target to produce an altitude error signal and said second signal representative of azimuthal bearing with a heading signal to produce an azimuth error signal; and
   d. automatic piloting means for controlling said flying target in accordance with said altitude error signal, said azimuth error signal and said speed profile signal along a preselected flight path independently of ground control.

2. The target control system of claim 1 further comprising override control means for decoupling said altitude error signal, said azimuth error signal and said speed profile signal to control said flying target in response to an RF command control signal.

3. The target control system of claim 2 wherein said means for producing said first signal and said second signal comprises a TACAN transceiver.

4. The target control system of claim 1 wherein said means for producing said first signal and said second signal comprises a TACAN transceiver.

5. A target control system for directing a target toward an object radiating a TACAN signal comprising:
   a. means for producing signals representative of range and azimuthal bearing of said target to said object in response to said TACAN signal;
   b. storage means addressed by said range signal for producing altitude and speed control signals in response to a preselected altitude and speed profile stored in said storage means in a storage location related to said range signal;
   c. automatic control means for controlling the flight path of said target in response to said azimuthal bearing signal and said altitude and speed control signals.

6. The target control system of claim 5 further comprising an RF command control device for controlling said flight path of said target from RF command control signals.

7. The target control system of claim 6 wherein said RF command control device includes a decoupler for decoupling said azimuthal bearing signal and said altitude and speed control signal from said automatic control means.

8. The target control system of claim 7 wherein said means for producing signals representative of range and azimuthal bearing comprises a TACAN transceiver.

9. The target control system of claim 7 wherein said automatic control means comprises an automatic pilot.

10. The target control system of claim 6 wherein said means for producing signals representative of range and azimuthal bearing comprises a TACAN transceiver.

11. The target control system of claim 6 wherein said automatic control means comprises an automatic pilot.

12. The target control system of claim 5 wherein said means for producing signals representative of range and azimuthal bearing comprises a TACAN transceiver.

13. The target control system of claim 5 wherein said automatic control means comprises an automatic pilot.

* * * * *